(12) United States Patent
Patil et al.

(10) Patent No.: US 10,781,816 B2
(45) Date of Patent: Sep. 22, 2020

(54) HYDRAULIC MOTOR BRAKE

(71) Applicant: Eaton Intelligent Power Limited, Dublin (IE)

(72) Inventors: Sagar Chandrakant Patil, Kolhapur (IN); Yashvantrao Uttamrao Patil, Pune (IN); Shivam Bhadoria, Uttarpradesh (IN); Trimbak Shridhar Attarde, Pune (IN)

(73) Assignee: Eaton Intelligent Power Limited, Dublin (IE)

( * ) Notice: Subject to any disclaimer, the term of this patent is extended or adjusted under 35 U.S.C. 154(b) by 104 days.

(21) Appl. No.: 15/948,437

(22) Filed: Apr. 9, 2018

(65) Prior Publication Data

US 2018/0298898 A1 Oct. 18, 2018

(30) Foreign Application Priority Data

Apr. 13, 2017 (IN) .............................. 201711013236

(51) Int. Cl.
*F04C 2/10* (2006.01)
*F04C 15/00* (2006.01)
(Continued)

(52) U.S. Cl.
CPC ............ *F04C 15/0084* (2013.01); *B60T 1/00* (2013.01); *F03C 2/08* (2013.01); *F16D 55/38* (2013.01);
(Continued)

(58) Field of Classification Search
CPC .. B60T 1/062; F16D 2121/06; F16D 2121/10; F16D 2121/12; F04C 15/0084
See application file for complete search history.

(56) References Cited

U.S. PATENT DOCUMENTS 3,619,085 A 11/1971 Nuss et al.
3,680,666 A 8/1972 Sommer
(Continued)

FOREIGN PATENT DOCUMENTS

CN 101356322 A 1/2009
DE 31 25 087 A1 1/1983
(Continued)

OTHER PUBLICATIONS

"Low Speed, High Torque Motors" Eaton Powering Business Worldwide, Eaton Hydraulics Group, 294 pages (2016).
(Continued)

*Primary Examiner* — Bradley T King
(74) *Attorney, Agent, or Firm* — Merchant & Gould P.C.

(57) ABSTRACT

A hydraulic motor brake for providing load holding torque to a hydraulic motor and comprising a housing, a plate fixedly mounted within the housing, a piston mounted for bi-directional translation relative to the plate along a longitudinal axis, and a plurality of friction-producing members arranged such that the piston and plate at least partially define a brake release chamber and the piston, normally biased in engagement with the friction-producing members to produce load holding torque, translates away from the plate and disengages from the friction-producing members to stop producing load holding torque in response to pressurized hydraulic fluid being received by the brake release chamber. The hydraulic motor brake further comprises a wear plate with the brake housing and wear plate defining bores arranged in coaxial alignment with threaded bores of the hydraulic motor for detachably attaching the hydraulic motor brake to the hydraulic motor as a self-contained unit.

18 Claims, 9 Drawing Sheets

(51) Int. Cl.
  *F16L 55/42* (2006.01)
  *F16D 65/18* (2006.01)
  *B60T 1/00* (2006.01)
  *F03C 2/08* (2006.01)
  *F16D 55/38* (2006.01)
  *F16D 121/06* (2012.01)
  *F16D 125/04* (2012.01)
  *F16D 121/14* (2012.01)
  *F16D 127/02* (2012.01)
  *F16D 129/02* (2012.01)
  *F16D 125/06* (2012.01)

(52) U.S. Cl.
  CPC ........... *F16D 65/18* (2013.01); *F16D 65/186* (2013.01); *F16L 55/42* (2013.01); *F04C 2/102* (2013.01); *F16D 2121/06* (2013.01); *F16D 2121/14* (2013.01); *F16D 2125/04* (2013.01); *F16D 2125/06* (2013.01); *F16D 2127/02* (2013.01); *F16D 2129/02* (2013.01)

(56) References Cited

U.S. PATENT DOCUMENTS

| | | | |
|---|---|---|---|
| 4,014,414 A | 3/1977 | Yamamoto et al. | |
| 4,184,573 A | 1/1980 | Bricker et al. | |
| 4,187,931 A | 2/1980 | Balzer | |
| 4,342,256 A | 8/1982 | Andersen et al. | |
| 4,470,487 A | 9/1984 | Blatt | |
| 4,613,292 A | 9/1986 | Bernstrom et al. | |
| 4,645,039 A | 2/1987 | Lewis et al. | |
| 4,667,527 A | 5/1987 | Ehrlinger et al. | |
| 4,736,821 A | 4/1988 | Ries | |
| 4,972,761 A | 11/1990 | Thomsen | |
| 4,981,423 A | 1/1991 | Bissonnette | |
| 5,679,993 A * | 10/1997 | Oswald | F16D 55/28 188/171 |
| 5,836,231 A | 11/1998 | Leinonen | |
| 5,992,578 A | 11/1999 | Lallier | |
| 6,132,194 A | 10/2000 | Wenker et al. | |
| 6,158,993 A | 12/2000 | Friedrichsen et al. | |
| 6,253,882 B1 | 7/2001 | White | |
| 6,321,882 B1 | 11/2001 | Heckel et al. | |
| 6,345,968 B1 | 2/2002 | Shupe | |
| 6,357,558 B1 | 3/2002 | Case et al. | |
| 6,459,182 B1 * | 10/2002 | Pfann | H02K 7/1025 188/161 |
| 6,585,088 B1 | 7/2003 | Fontaine et al. | |
| 6,743,002 B1 | 6/2004 | Millar et al. | |
| 6,772,863 B2 | 8/2004 | Jessen et al. | |
| 7,014,028 B2 | 3/2006 | Buck et al. | |
| 7,287,969 B2 | 10/2007 | Fugle | |
| 7,743,893 B2 * | 6/2010 | Daigre | F16D 55/36 188/170 |
| 8,157,552 B2 | 4/2012 | Kurokawa et al. | |
| 9,175,563 B2 | 11/2015 | Attarde et al. | |
| 9,551,222 B2 | 1/2017 | Lucas | |
| 10,288,133 B1 * | 5/2019 | Godinsky | F16D 55/22 |
| 2001/0028193 A1 | 10/2001 | Wiedemann | |
| 2003/0101720 A1 | 6/2003 | Walls | |
| 2004/0060779 A1 | 4/2004 | Kreger | |
| 2006/0159581 A1 | 7/2006 | Fugle | |
| 2008/0307784 A1 | 12/2008 | White, Jr. | |
| 2010/0178188 A1 | 7/2010 | White, Jr. | |
| 2010/0263969 A1 * | 10/2010 | Bayer | B60K 17/046 188/72.3 |
| 2011/0017059 A1 | 1/2011 | Heren et al. | |
| 2015/0048188 A1 | 12/2015 | Harsia | |
| 2016/0069404 A1 | 3/2016 | Feusse et al. | |

FOREIGN PATENT DOCUMENTS

| | | |
|---|---|---|
| DE | 100 22 758 A1 | 11/2000 |
| DE | 100 06 460 A1 | 8/2001 |
| EP | 0 085 906 A2 | 8/1983 |
| EP | 1 070 847 A2 | 1/2001 |
| EP | 1 072 791 A2 | 1/2001 |
| GB | 1 441 173 A | 6/1976 |
| IT | 1232590 | 2/1992 |
| JP | S58-85370 A | 5/1983 |
| JP | H04-230471 A | 8/1992 |
| JP | H05-106549 A | 4/1993 |
| WO | 01/61150 A1 | 8/2001 |
| WO | 02/059482 A1 | 8/2002 |
| WO | 2007/083232 A2 | 7/2007 |

OTHER PUBLICATIONS

Extended European Search Report for Application No. 18166911.0 dated Oct. 17, 2018.

* cited by examiner

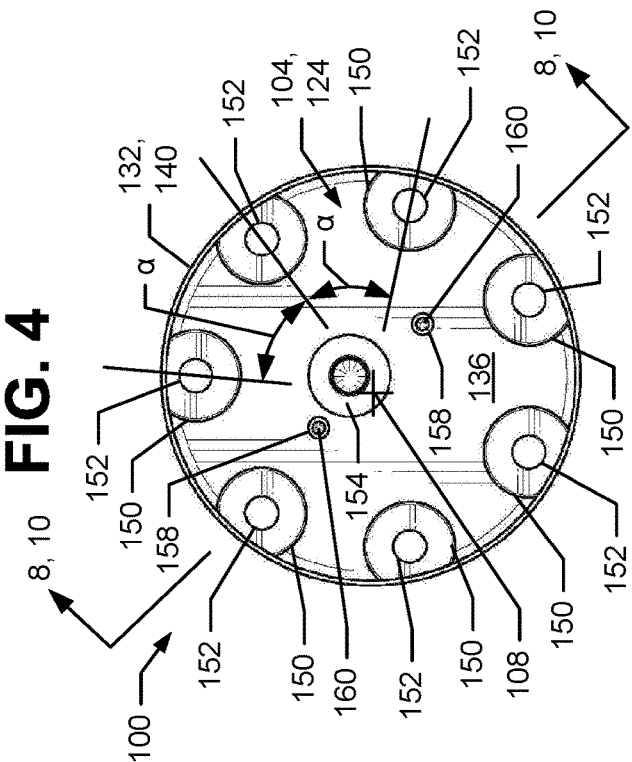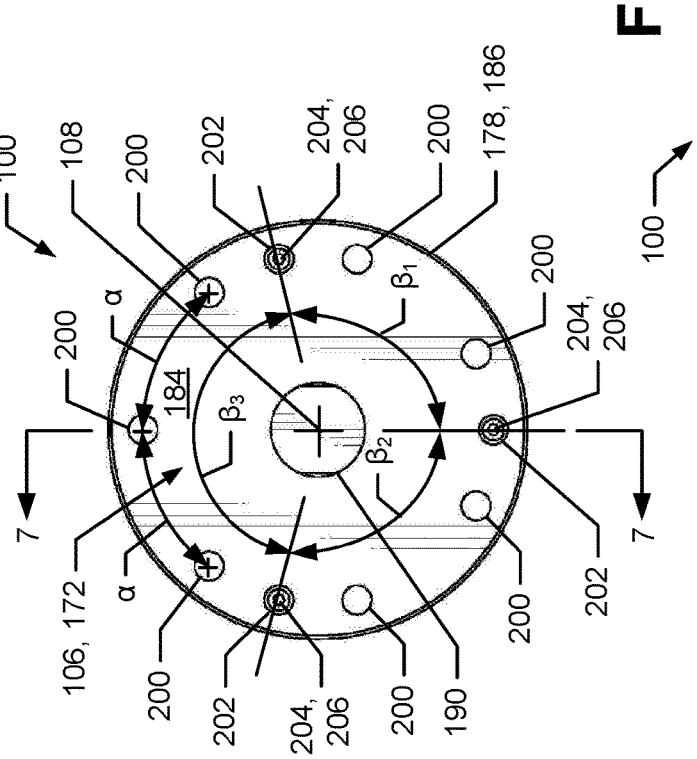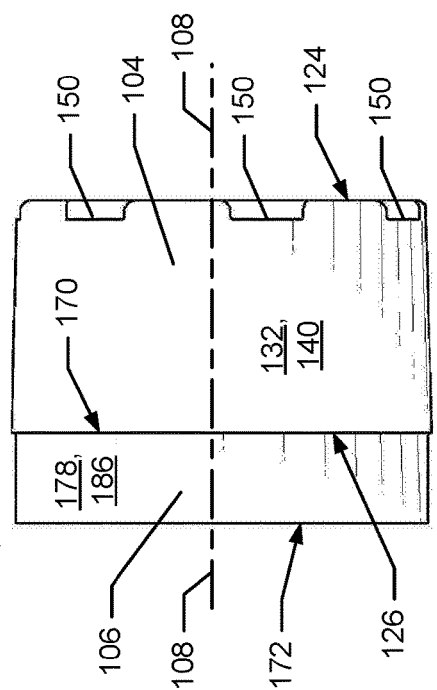

HYDRAULIC MOTOR BRAKE

This application claims benefit of Serial No. 201711013236, filed 13 Apr. 2017 in India and which application is incorporated herein by reference. To the extent appropriate, a claim of priority is made to the above disclosed application.

FIELD OF THE INVENTION

The present invention relates generally to the field of hydraulic motors and, more particularly, to hydraulic motor brakes.

BACKGROUND

Many of today's hydraulic motors are equipped with brakes that provide load holding torque. Such hydraulic motors frequently comprise low speed, high torque gerotor motors and the brakes typically comprise "spring-applied, pressure-released" brakes that are integrated with the hydraulic motors. In some "spring-applied, pressure-released" brakes, friction members that provide the brake's load holding torque are biased in a normally-engaged condition by one or more spring members acting on a piston that, in turn, causes engagement of the friction members. The brake's load holding torque is generally overcome and the friction members are moved into a disengaged condition by the application of hydraulic pressure that exerts a force on the piston sufficient to overcome the biasing force exerted by the spring members. With the friction members disengaged, the hydraulic motor operates normally.

Often, the hydraulic pressure needed to disengage the friction members is provided by case oil supplied to a brake release cavity present between the brake's piston and a brake member coupled to the hydraulic motor's drive shaft. Unfortunately, the pressure of the case oil may fluctuate, thereby causing the piston's position relative to the spring members to also fluctuate. Such fluctuation of the piston's position causes excessive cycling of the spring members that can, in turn, reduce the life of the spring members. Additionally, fluctuation of the piston's position may cause premature failure of piston seals, as well as other o-rings or seals, and may cause dragging of the brake.

In addition, with many of today's hydraulic motors, a brake must provide load holding torque ranging from 2,000 lb-in to 5,000 lb-in. Providing such load holding torque with corresponding higher stroke at low torque and higher stress at high torque further contributes to reducing the life of the spring members. To avoid premature spring failure in such applications, special, high performance, spring members may be used, but such spring members are more expensive than conventional spring members and result in increased cost for brake manufacture. If special, high performance, spring members are not used and premature spring member failure occurs, replacement of the spring members typically requires disassembly of the entire hydraulic motor and brake because the motor and brake are integrated together and do not comprise discrete components. Such disassembly and repair can be time-consuming and costly.

Therefore, there is a need in the industry for a hydraulic motor brake capable of providing a wide range of load holding torque with no or little increased cost, that reduces premature failure of piston seals and other seals present therein, that decreases possible dragging of the brake, that avoids costly disassembly, and that addresses these and other problems, issues, deficiencies, or shortcomings of present hydraulic motor brakes.

SUMMARY

Broadly described, the present invention comprises a hydraulic motor brake, including apparatuses and methods, for selectively providing load holding torque to a hydraulic motor. In an inventive aspect and without limitation, the hydraulic motor brake comprises a longitudinally translating piston, plate and friction-producing members arranged such that the piston and plate at least partially define a variable volume, brake release chamber and the piston, which is normally biased in engagement with the friction-producing members to produce load holding torque, translates away from the plate and disengages from friction-producing members to cease the generation of load holding torque in response to pressurized hydraulic fluid being received by the brake release chamber. In another inventive aspect and absent limitation, the hydraulic motor brake further comprises a longitudinally translating piston, friction-producing members normally engaged by the piston, and a brake housing defining at least one bore therethrough in coaxial alignment with a threaded bore defined in the piston such that insertion of a fastener into said threaded bore and tightening of the fastener disengages the piston from the friction-producing members and ceases the generation of load holding torque. In still another inventive aspect and not for limitation, the hydraulic motor brake comprises a longitudinally translating piston, plate, friction-producing members, and biasing members arranged such that the plate tends to minimize cycling of the biasing members, thereby prolong the lifespan of the biasing members. In yet another inventive aspect and without limitation, the hydraulic motor brake comprises a self-contained unit having a plurality of coaxially aligned bores arranged for coaxial alignment with a plurality of bores of a hydraulic motor and receipt of corresponding fasteners to detachably attach the hydraulic motor brake to the hydraulic motor.

Other inventive aspects, advantages and benefits of the present invention may become apparent upon reading and understanding the present specification when taken in conjunction with the appended drawings.

BRIEF DESCRIPTION OF THE DRAWINGS

FIG. 3 displays a side elevational view of the hydraulic motor brake of FIG. 1.

FIG. 4 displays a first end view of the hydraulic motor brake of FIG. 1.

FIG. 5 displays a second end view of the hydraulic motor brake of FIG. 1.

DETAILED DESCRIPTION OF EXAMPLE EMBODIMENTS

Figure 1:
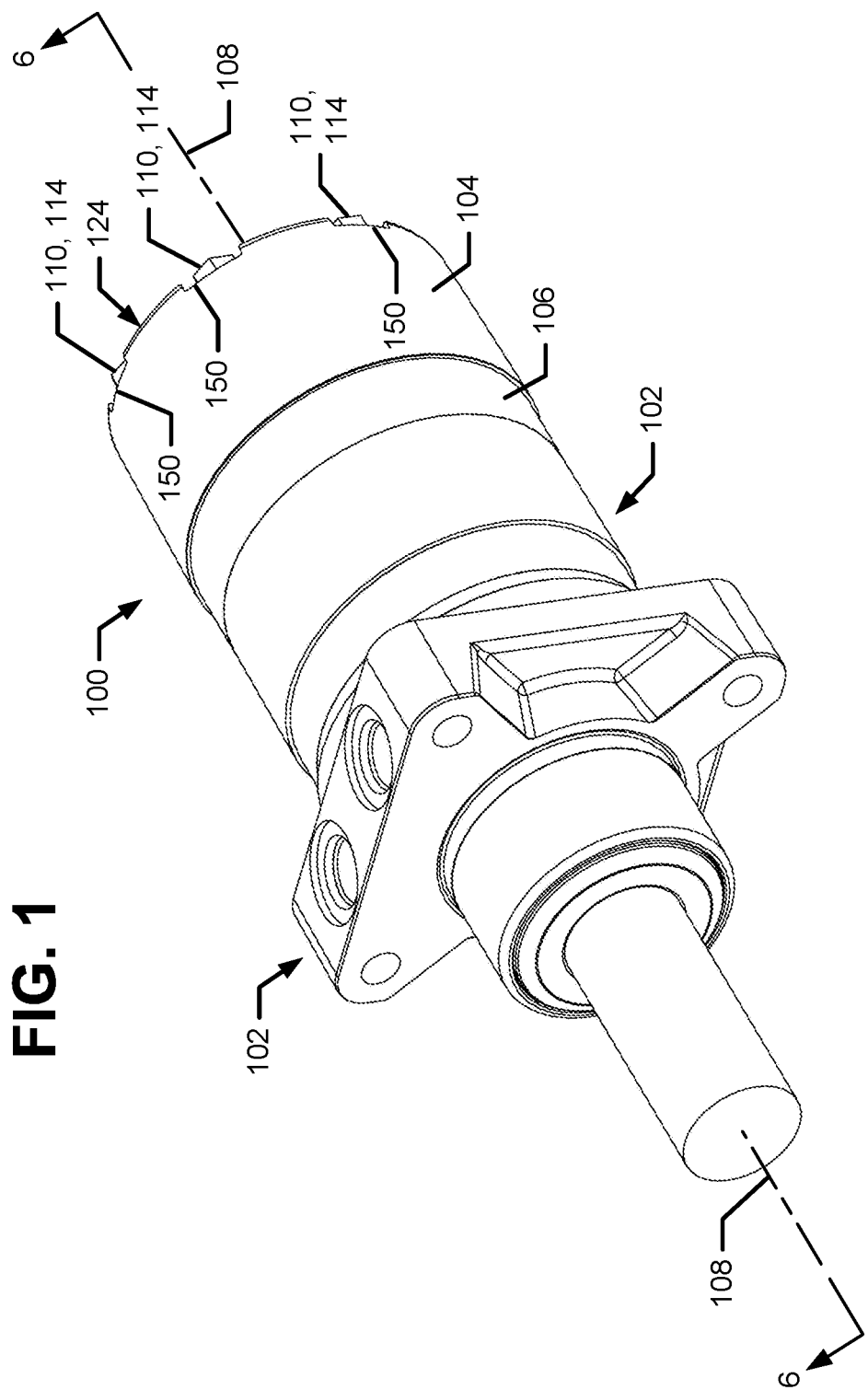
FIG. 1 displays a perspective view of a hydraulic motor brake, in accordance with an example embodiment of the present invention, coupled to a hydraulic motor.

Referring now to the drawings in which like elements are identified by like numerals throughout the several views, FIG. 1 displays a perspective view of a hydraulic motor brake 100, according to an example embodiment, attached to a hydraulic motor 102. The hydraulic motor brake 100 (also sometimes referred to herein as the "brake 100") may be employed with a variety of hydraulic motors to provide load holding torque to the hydraulic motors that can be released non-manually or manually. While illustrated and described herein with respect to a hydraulic motor 102 of the gerotor-type, it should be appreciated and understood that the brake 100 may be used with other types of hydraulic motors, other non-motor gerotor-type devices, or other devices requiring the application of load holding torque or parking torque. As used herein, the term "gerotor" means and includes both a conventional gerotor device in which the ring member includes integrally-formed internal teeth, and roller gerotors in which the internal teeth of the ring member comprise cylindrical roller members. Also, as used herein, the term "hydraulic motor" means and includes devices commonly referred to as hydraulic motors, but more generally also includes any rotary fluid pressure device requiring the application of load holding torque or parking torque. Additionally, as used herein, the term "hydraulic fluid" means and refers to any incompressible fluid or compressible fluid (such as, but not limited to, oil, air, and water) used by or in connection with a hydraulic motor or hydraulic motor brake.

Figure 2:
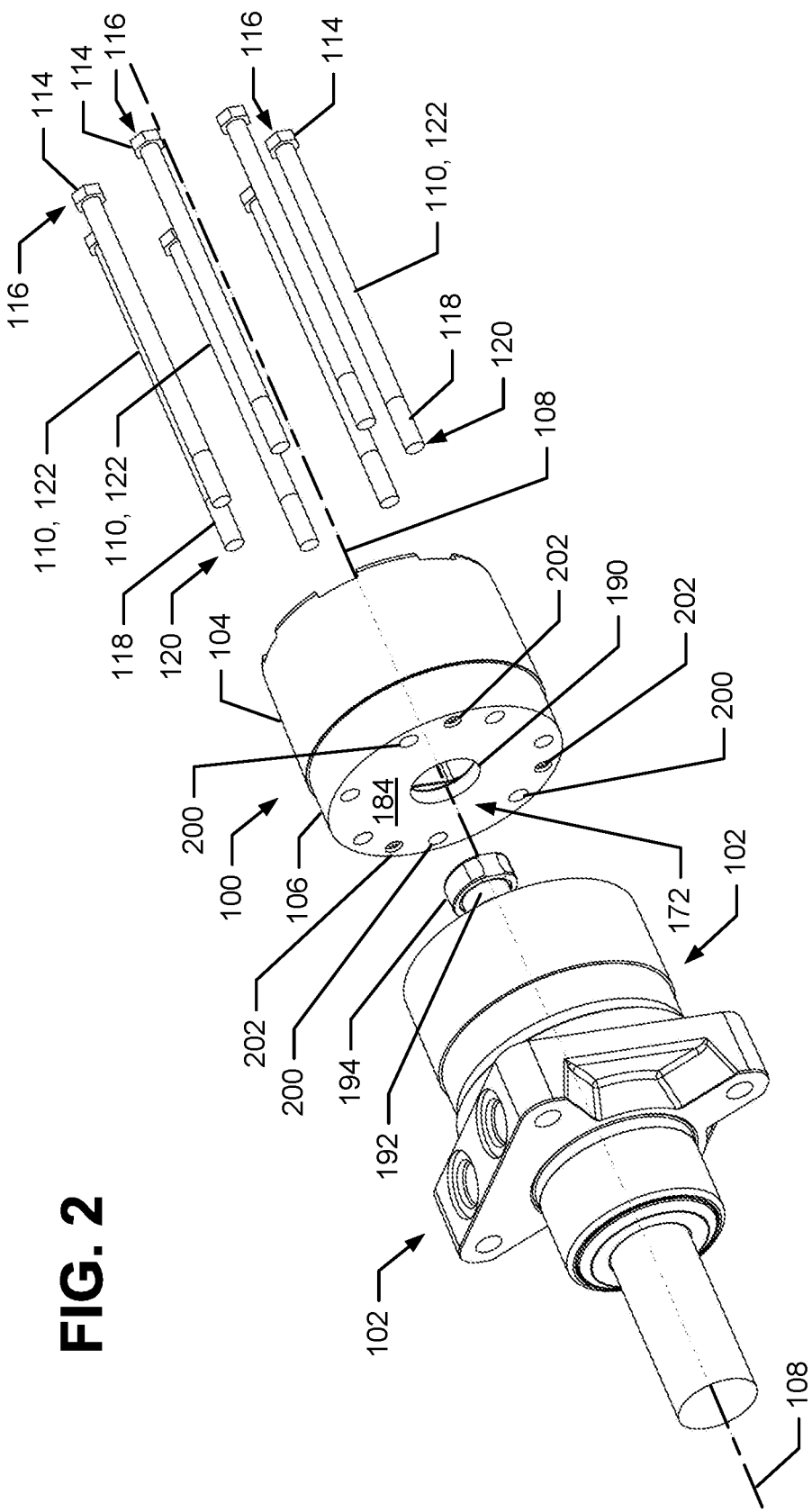
FIG. 2 displays an exploded view of the hydraulic motor brake and hydraulic motor of FIG. 1.

The brake 100 comprises a brake housing 104 and a wear plate 106 that is longitudinally interposed between the hydraulic motor 102 and the brake housing 104 along and about longitudinal axis 108. The brake 100, as illustrated in the exploded view of FIG. 2, is detachably attached to the hydraulic motor 102 by a plurality of fasteners 110 that extend into respective threaded bores 112 of the hydraulic motor 102 after passing through the brake housing 104 and wear plate 106. According to an example embodiment, the fasteners 110 comprise bolts having respective heads 114 at first ends 116, threaded portions 118 at second ends 120, and non-threaded shank portions 122 between the heads 114 and threaded portions 118. It should be appreciated and understood that in other example embodiments, the fasteners 110 may comprise forms of fasteners 110 other than bolts and that the brake 100 may be detachably attached to a hydraulic motor 102 by other components or methods.

Because the brake 100 comprises a separate component from the hydraulic motor 102 that may be attached to/detached from the hydraulic motor 102 by the operation of fasteners 110, it is not necessary to take apart the brake 100 or hydraulic motor 102 in order to separate them from one another. Also, because the brake 100 comprises a separate component from the hydraulic motor 112, the brake 100 may be manufactured at a facility different than the facility at which the hydraulic motor 102 is manufactured and be subsequently mated with the hydraulic motor 102. This allows manufacturers of hydraulic motors and brakes to more efficiently and effectively allocate facilities and resources for production. Additionally, by virtue of the brake 100 comprising a separate component that is not integral with a particular hydraulic motor 102, the brake 100 is essentially a modular component that may be attached to and used with a wide variety of hydraulic motors 102, including, potentially, those hydraulic motors 102 manufactured by a competitor. In addition, due to the modularity of the brake 100 and ease of detachment from a hydraulic motor 102, the brake 100 and hydraulic motor 102 are easier to replace in the field or otherwise outside of a repair facility when either of the brake 100 or hydraulic motor 102 requires repair or replacement.

Referring now to FIGS. 3 and 6-8, the brake housing 104 has a first end 124 and an opposed second end 126 at which the brake housing 104 longitudinally abuts the wear plate 106. The brake housing 104 comprises a wall 128 having an inner surface 130 and an outer surface 132. The inner surface 130 defines an internal chamber 134 of the brake housing 104 in which a plurality of components are present. The outer surface 132 includes a first end outer surface 136 at the brake housing's first end 124 that is generally perpendicular to longitudinal axis 108, a second end outer surface 138 at the brake housing's second end 126 that is generally perpendicular to longitudinal axis 108, and a lateral outer surface 140 that extends generally about and parallel to longitudinal axis 108 between the first end outer surface 136 and the second end outer surface 138. The brake housing's wall 128 defines an opening 142 at the brake housing's second end 126 that is in fluid communication with the brake housing's internal chamber 134. According to an example embodiment, the opening 142 has a circular shape such that the wall's second end outer surface 138 comprises an annular surface that contacts and abuts the wear plate 106. Also according to an example embodiment, the brake housing's wall 128, internal chamber 134, and opening 142 form a brake housing 104 having a cap-like shape with the brake housing 104 being closed at the first end 124 and open at the second end 126. It should, however, be appreciated and understood that while the brake housing 104 may have a cap-like shape in a particular example embodiment, the brake housing 104 may have a different shape in other example embodiments.

The brake housing's wall 128 and first end outer surface 136, as seen in the end view of FIG. 4, define a plurality of recesses 150 at the brake housing's first end 124. Each recess 150 is sized, shaped and otherwise configured to receive the head 114 of a fastener 110 such that, when present, the shank side of the fastener's head 114 resides against and in contact with the brake housing's wall 128 at the base of the recess 150 and the non-shank side of the fastener's head 114 is generally flush with the brake housing's first end 124. According to an example embodiment, the recesses 150 have generally clipped, cylindrical shapes and are radially-located about longitudinal axis 108 at respective circumferential locations near the brake housing's lateral outer surface 140 such that circumferentially adjacent recesses 150 define angles, a, therebetween which have equal angular measures.

Figure 6:
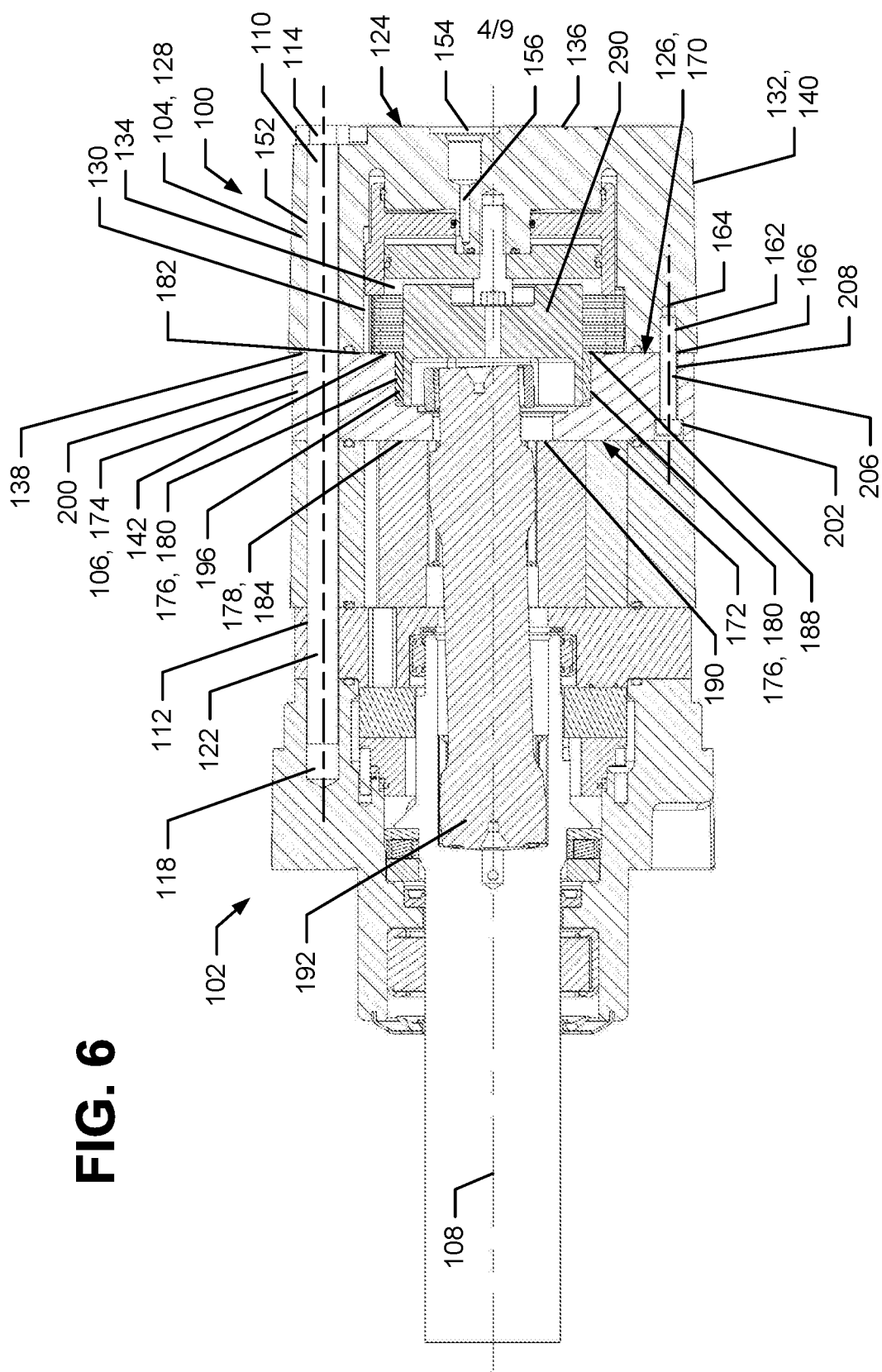
FIG. 6 displays a sectional view of the hydraulic motor brake and hydraulic motor of FIG. 1 taken along section lines 6-6.
Figure 7:
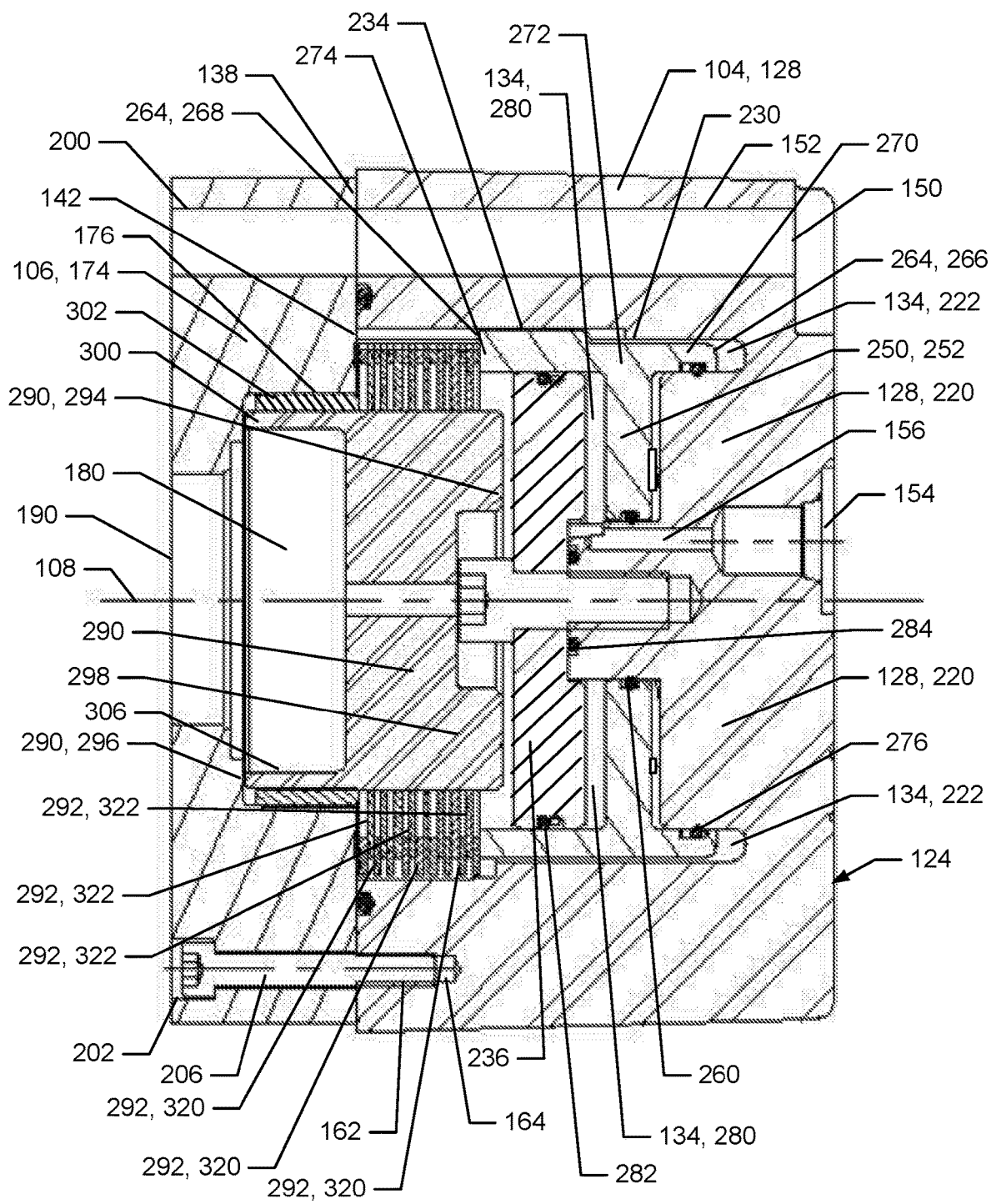
FIG. 7 displays a sectional view of the hydraulic motor brake of FIG. 5 taken along section lines 7-7.

The brake housing's wall 128 also defines a plurality of bores 152 with each bore 152 extending through the brake housing's wall 128 generally parallel to longitudinal axis 108 and between a respective recess 150 and the brake housing's second end 126 (see also FIGS. 6 and 7). The bores 152, according to an example embodiment and cooperative with corresponding recesses 150, have cylindrical shapes and are radially-located about longitudinal axis 108 at respective circumferential locations near the brake housing's lateral outer surface 140. Circumferentially adjacent bores 152 define an angle, α, therebetween such that the longitudinal axis of each bore 152 is generally centered relative to and coaxial with the longitudinal axis of a respective recess 150. Generally, each bore 152 is non-threaded and is sized to snugly receive a non-threaded shank portion 122 of a fastener 110 when the brake 100 is detachably secured to a hydraulic motor 102.

Additionally, the brake housing's wall 128 and first end outer surface 136 define a release port 154 configured to receive and connect to a connector fitting of a hydraulic fluid source such as, but not limited to, a hose or tube. The brake housing's wall 128 also defines a channel 156 extending from the release port 154 to brake release chamber 280 (described below) such that the release port 154, channel 156, and brake release chamber 280 are in fluid communication (see also FIGS. 6 and 7). Together, the release port 154 and channel 156 are operable to receive and deliver hydraulic fluid to brake release chamber 280 in order to conventionally and non-manually release the brake 100.

Figure 8:
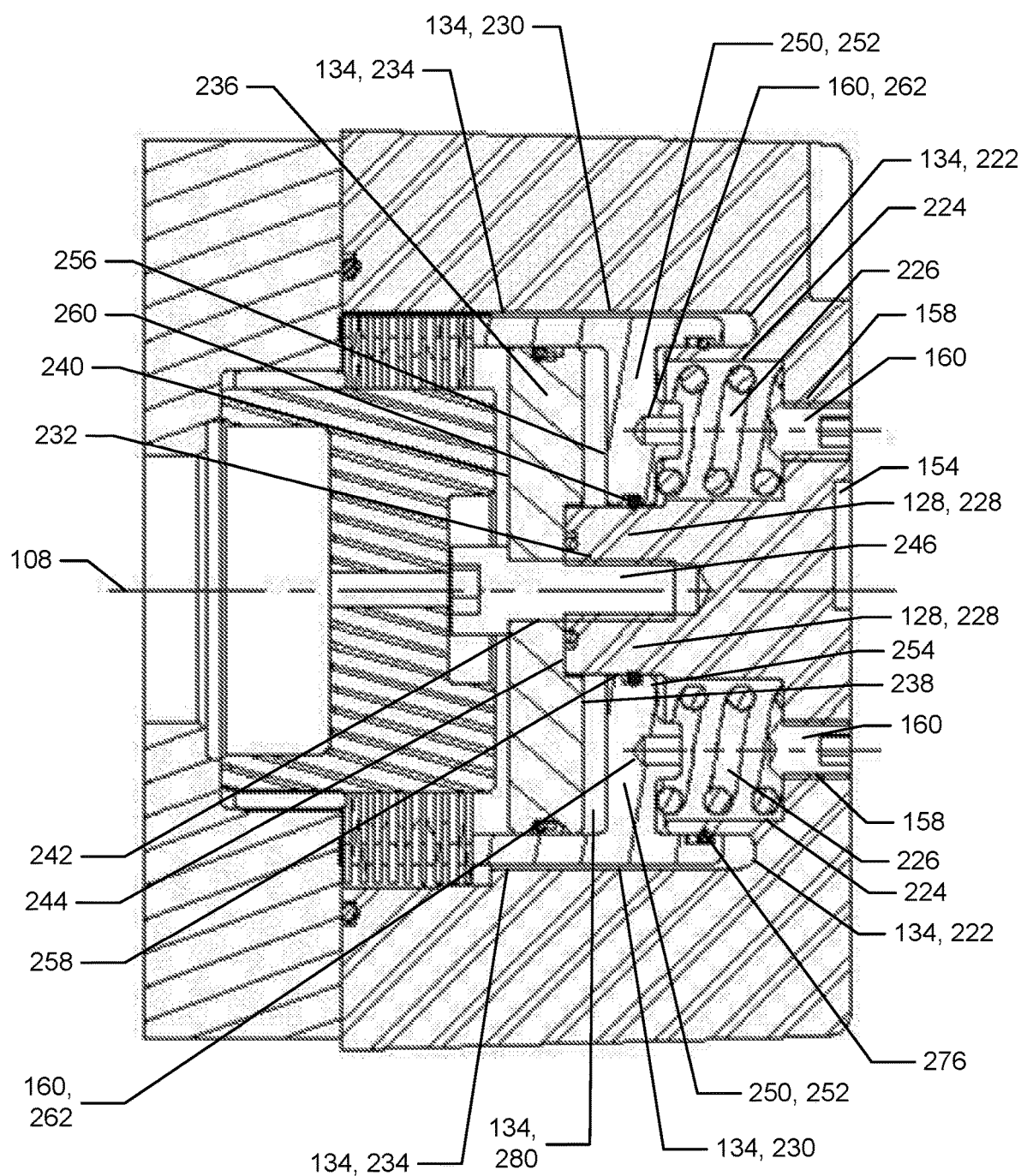
FIG. 8 displays a sectional view of the hydraulic motor brake of FIG. 4 taken along section lines 8-8.
Figure 10:
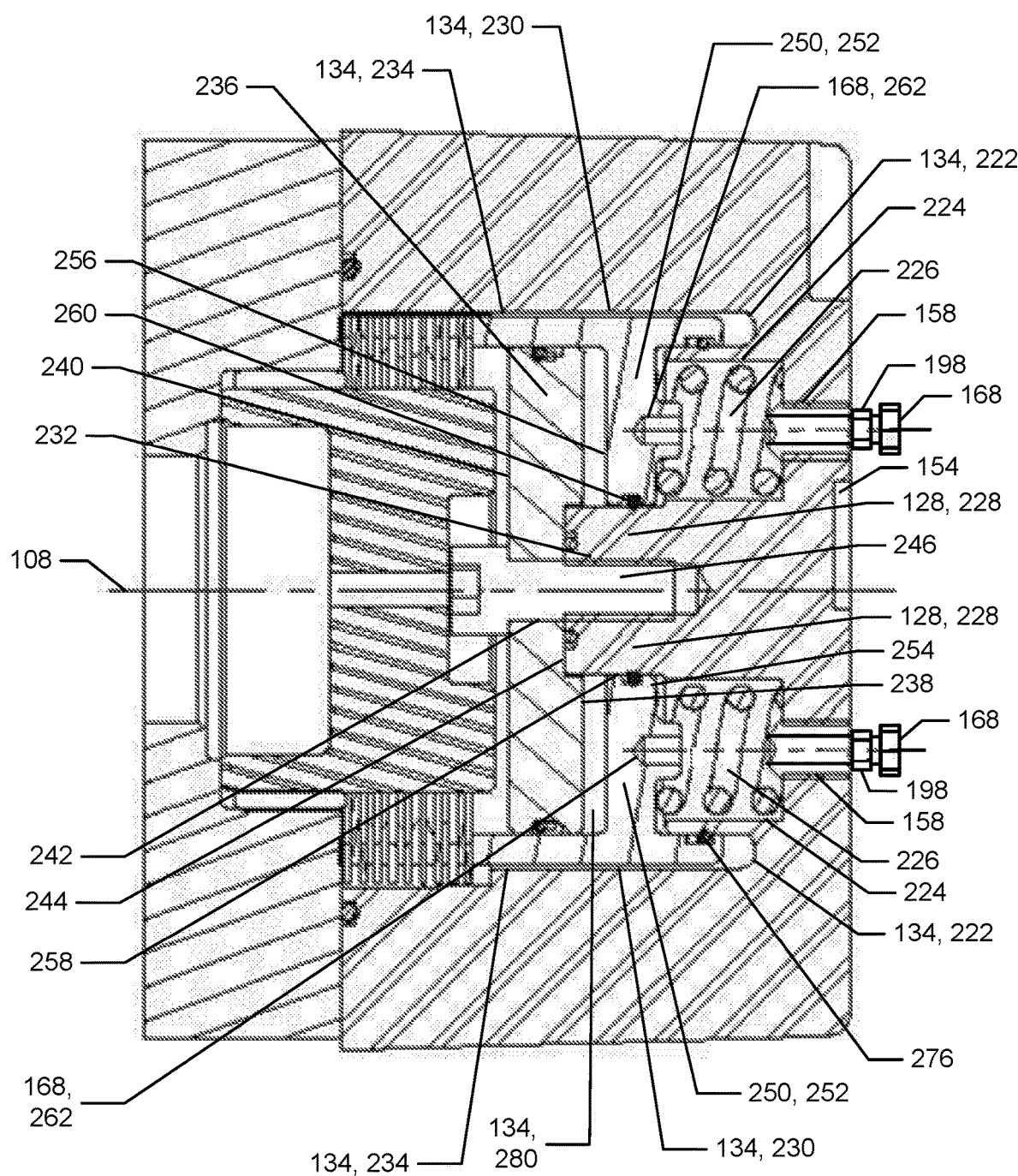
FIG. 10 displays a sectional view of the hydraulic motor brake of FIG. 4 taken along section lines 10-10, with the hydraulic motor brake configured for manual brake release.

In addition, the brake housing's wall 128 and first end outer surface 136 define a pair of threaded holes 158 for use in manually releasing the brake 100 (see also FIG. 8). When it is not necessary to release the brake 100 manually, cooperatively-threaded plugs 160 are received and threadedly-engaged within threaded holes 158 to prevent debris from entering the brake's internal chamber 134. The plugs 160, according to an example embodiment, comprise threaded set pins. It should be appreciated and understood, however, that other devices capable of plugging threaded holes 158 and preventing debris from entering internal chamber 134 (such as, but not limited to, set screws or stoppers) may be used in lieu of plugs 160 in other example embodiments. When the brake 100 is to be manually released and as described in greater detail below with reference to FIG. 10, plugs 160 are removed from threaded holes 158 and fasteners 168 having diameters smaller than the diameters of threaded holes 158 and having threads compatible with threaded bores 262 of the piston's disc portion 252 (described in more detail below) extending generally along the entire length of the fasteners' shanks are, respectively, threaded into threaded bores 262 of the piston's disc portion 252 after insertion through threaded holes 158 absent engagement between the fasteners' threads and the threads of threaded holes 158. In accordance with an example embodiment, fasteners 168 comprise threaded bolts, but may comprise other forms of fasteners in other example embodiments.

As seen in FIGS. 6 and 7, the brake housing's wall 128 further defines a plurality of bores 162 that are configured for attachment of the wear plate 106 to the brake housing 104. The bores 162, according to an example embodiment, have a generally cylindrical shape and extend parallel to longitudinal axis 108 between first ends 164 internally located within the brake housing's wall 128 and second ends 166 at the brake housing's second end 126. Near first end 164 of each bore 162, a portion is threaded for engagement with a cooperatively threaded portion of a fastener 206. The bores 162 are radially-located and circumferentially arranged about longitudinal axis 108 at locations near the brake housing's lateral outer surface 140. The bores 162 are also located such that bores 162 at circumferentially adjacent locations define respective angles, $\beta_1$, $\beta_2$, and $\beta_3$, therebetween. According to an example embodiment, angles $\beta_1$ and $\beta_2$ have a measure of one hundred three degrees (103°) and angle $\beta_3$ has a measure of one hundred fifty-four degrees (154°). Additionally, each bore 162 is generally circumferentially located at a location between a respective pair of circumferentially adjacent bores 152.

As briefly described above and with reference to FIGS. 1 and 2, the brake 100 also comprises a wear plate 106 longitudinally interposed between the hydraulic motor 102 and the brake housing 104. The wear plate 106 has a first end 170 adjacent to, in contact with, and abutting the second end 126 of brake housing 104 and a second end 172 adjacent to, in contact with, and abutting the hydraulic motor 102 (when the brake 100 is attached to the hydraulic motor 102 (see FIGS. 1, 3 and 7). The wear plate 106 has a wall 174 with a portion that extends about longitudinal axis 108 between the wear plate's first and second ends 170, 172. The wear plate's wall 174 has an inner surface 176 and an outer surface 178. The inner surface 176 defines an internal chamber 180 of the wear plate 106 about longitudinal axis 108 in which various components are present. The outer surface 178 includes a first end outer surface 182 extending radially and perpendicular to longitudinal axis 108 at the wear plate's first end 170, a second end outer surface 184 extending radially and perpendicular to longitudinal axis 108 at the wear plate's second end 172, and a lateral outer surface 186 that extends about and parallel to longitudinal axis 108 between the wear plate's first and second ends 170, 172.

The wear plate's wall 174 defines a first opening 188 about longitudinal axis 108 at the wear plate's first end 170 and a second opening 190 about longitudinal axis 108 at the wear plate's second end 172. The first and second openings 188, 190 are in fluid communication with the wear plate's internal chamber 180. According to an example embodiment, the first and second openings 188, 190 have generally circular shapes and the first end outer surface 182 extends annularly around the first opening 188, while the second end outer surface 184 extends annularly around the second opening 190. Also according to an example embodiment, the wear plate's wall 174 forms a cap-like member oriented along longitudinal axis 108 relative to the brake housing 104 such that the wear plate's first end outer surface 182 abuts and is in contact with the brake housing's second end outer surface 138 and the wear plate's second end outer surface 184 abuts and is in contact with the housing of a hydraulic motor 102 when the brake 100 is detachably attached to a hydraulic motor 102 as in FIGS. 1 and 7. It should be appreciated and understood that while the wear plate 106 is described herein as being a generally cap-like member, the wear plate 106 may have different shapes in other example embodiments.

The wear plate's first opening 188 is sized, located and shaped so as to receive part of a brake shaft 290 of the brake 100 (described in more detail below) therethrough. The wear plate's second opening 190 is sized, located and shaped so as to receive a drive shaft 192 and attached collar 194 of a hydraulic motor 102 through the first opening 188 during attachment of the brake 100 to the hydraulic motor 102. The wear plate's internal chamber 180 has a generally cylindrical shape and is sized and configured to receive a portion of the brake shaft 290, and to receive a portion of a hydraulic motor's drive shaft 192 and attached collar 194. Together, the collar 194 and brake shaft 290 are operable to convert orbital motion of the drive shaft 192 into rotary motion of the brake shaft 290. Bushings 196 mounted to the wear plate's inner surface 176 and located between the brake shaft 290 and inner surface 176 restrain the brake shaft 290 and aid in converting the drive shaft's orbital motion in to rotary motion.

The wear plate's wall 174 also defines a plurality of bores 200 that extend longitudinally through the wear plate 106 between the wear plate's first and second ends 170, 172 and generally parallel to longitudinal axis 108. The bores 200, according to an example embodiment and as seen in FIGS. 2, and 5-7, have cylindrical shapes and are radially-located about longitudinal axis 108 at respective circumferential locations near the wear plate's lateral outer surface 186. Circumferentially adjacent bores 200 define angles, a, therebetween such that the longitudinal axis of each bore 200 is generally coaxial with the longitudinal axis of a respective brake housing bore 152. Generally, each bore 200 is non-threaded and is sized to snugly receive a non-threaded shank portion 122 of a fastener 110 when the brake 100 is detachably attached to a hydraulic motor 102.

Additionally, the wear plate's wall 174 defines a plurality of recesses 202 at the wear plate's second end 172 (see FIG. 5) that are sized, shaped and otherwise configured to receive the heads 204 of respective fasteners 206 such that the shank side of the fastener's head 204 contacts the wear plate's wall 174 at the base of the recess 202 and the non-shank side of the fastener's head 204 is flush with the wear plate's second end 172. The fasteners 206 detachably secure the wear plate 106 to the brake housing 104. The recesses 202, in accordance with an example embodiment, have generally cylindrical shapes and are radially-located about longitudinal axis 108 at respective circumferential locations near the wear plate's lateral outer surface 186. The recesses 202 are also located such that recesses 202 define angles, $\beta_1$, $\beta_2$, and $\beta_3$, therebetween. According to an example embodiment, angles $\beta_1$ and $\beta_2$ have measures of one hundred three degrees (103°) and angle $\beta_3$ has a measure of one hundred fifty-four degrees (154°). Additionally, each recess 202 is generally circumferentially located at a location between a respective pair of bores 200 with the longitudinal axis of each recess 202 being coaxial with the longitudinal axis of a respective brake housing bore 162.

In addition, the wear plate's wall 174 defines a plurality of bores 208 extending longitudinally through the wear plate 106 and generally parallel to longitudinal axis 108. Each bore 208 extends between a respective recess 202 and the wear plate's first end 170 and has a longitudinal axis generally coaxially aligned with a longitudinal axis of a respective brake housing bore 162 (see FIGS. 6 and 7). The bores 208, according to the example embodiment and cooperative with recesses 202, have cylindrical shapes and are radially-located about longitudinal axis 108 at respective circumferential locations near the wear plate's lateral outer surface 186. The longitudinal axes of bores 208 define angles, $\beta_1$, $\beta_2$, and $\beta_3$, therebetween. According to an example embodiment, angles $\beta_1$ and $\beta_2$ have measures of one hundred three degrees (103°) and $\beta_3$ angle has a measure of one hundred fifty-four degrees (154°). Generally, each bore 208 is non-threaded and is sized to snugly receive a non-threaded shank portion of a fastener 206. According to an example embodiment, fasteners 206 comprise cap screws, however, it should be appreciated and understood that fasteners 206 may comprise other devices suitable for detachably attaching the wear plate 106 and the brake housing 104. It should also be appreciated and understood that through the use of fasteners 206, the wear plate 106 and brake housing 104 are detachably attached together as a single, modular unit with the wear plate 106 at least partially retaining internal components of the brake 100 described below within the brake 100 and allowing the brake 100 to be manufactured separately from a hydraulic motor 102 with which the brake 100 is used.

As briefly described above and referring now to the sectional views of FIGS. 6-8, the brake housing's wall 128 and internal surface 130 define internal chamber 134 which is in fluid communication with the brake housing's second opening 142 at the brake housing's second end 126. A portion 220 of the brake housing's wall 128 nearest the brake housing's first end 124 and having a circular cross-sectional shape perpendicular to longitudinal axis 108 protrudes toward the brake housing's second end 126 and into the internal chamber 134. The portion 220 of the brake housing's wall 128 defines a first portion 222 of internal chamber 134 having a generally annular cross-sectional shape perpendicular to longitudinal axis 108.

Portion 220 of the brake housing's wall 128 also defines a plurality of bores 224 in which biasing members 226 are present (see FIG. 8). The bores 224 are coaxially aligned with threaded holes 158 of the brake housing's wall 128 such that plugs 160 extend through threaded holes 158 and only slightly into bores 224. The biasing members 226, according to an example embodiment, comprise compression springs, but it should be appreciated and understood that other forms of biasing members 226 may be used in other example embodiments. The biasing members 226 are selected so as to exert an appropriate force on piston 250 (described below) and, hence, on brake pads 292 sufficient to provide the load holding torque desired of the brake 100.

Another portion 228 of the brake housing's wall 128 having a generally circular cross-sectional shape perpendicular to longitudinal axis 108 further protrudes from wall portion 220 toward the brake housing's second end 126 and into the internal chamber 134. The portion 228 of the brake housing's wall 128 defines a second portion 230 of internal chamber 134 also having a generally annular cross-sectional shape perpendicular to longitudinal axis 108. The brake housing's wall 128 defines a central bore 232 in wall portion 228 along longitudinal axis 108 that extends slightly into wall portion 220. The central bore 232 is threaded along at least part of its length.

The remaining, third portion 234 of internal chamber 134 extends between protruding portion 228 of the brake housing's wall 128 and the brake housing's second opening 142 at the brake housing's second end 126. The third portion 234 of internal chamber 134 has a generally circular cross-sectional shape perpendicular to longitudinal axis 108.

Located within internal chamber 134, the brake 100 comprises a plate 236 that is fixedly secured to the protruding portion 228 of the brake housing's wall 128 such that there is no relative motion between the protruding portion 228 of the brake housing's wall 128 and plate 236. The plate 236, according to an example embodiment, comprises a disc-like member having first and second sides 238, 240 and defines a central bore 242 extending therethrough about longitudinal axis 108 and between the first and second sides 238, 240. A recess 244 formed in the plate's first side 238 about longitudinal axis 108 is configured cooperative with and receives the protruding portion 228 of the brake housing's wall 128 therein. A fastener 246 inserted through the plate's central bore 242 and into the central bore 232 in brake housing wall portion 228 fixedly secures the plate 236 to brake housing wall portion 224. According to an example embodiment, the fastener 246 comprises a cap screw, but it should be appreciated and understood that the fastener 246 may comprise other types of fasteners or other devices or methods suitable for fixedly securing the plate 236 to the wall portion 228 of the brake housing 104.

The brake 100 also comprises a piston 250 that is movable bi-directionally along longitudinal axis 108. The piston 250, according to an example embodiment, comprises a disc portion 252 having a first side 254 nearest wall portion 220 and an opposed second side 256 nearest plate 236. The first side 254 of piston 250 is in contact with and engaged by biasing members 226. The piston 250 has a central bore 258 configured to receive protruding portion 228 of the brake housing's wall 128 therethrough such that the disc portion 252 extends about and translates relative to the protruding portion 228 of the brake housing's wall 128. An o-ring 260, present in a seat of disc portion 252, provides a seal between the disc portion 252 and the protruding portion 228 of the brake housing's wall 128 to limit and, preferably, prevent the flow of hydraulic fluid between the disc portion 252 and protruding portion 228 and into the portion of internal chamber 134 between the disc portion's first side 254 and protruding portion 220 of the brake housing's wall 128.

The disc portion 252 of the piston 250 defines a plurality of threaded bores 262 that extend into the disc portion's first side 254. The threaded bores 262 are coaxially aligned with threaded holes 158 in the brake housing's wall 128 and first end outer surface 136, and are adapted to receive respective fasteners 168 for use in manually releasing the brake 100. According to an example embodiment, the threaded bores 262 are also coaxially aligned with bores 224 and the longitudinal axes of the biasing members 226.

The piston 250, according to an example embodiment, further comprises a sleeve portion 264 that extends around the periphery of the piston's disc portion 252, around the periphery of the plate 236, and about longitudinal axis 108. The sleeve portion 264 has first and second ends 266, 268 and extends generally parallel to longitudinal axis 108 between the first and second ends 266, 268. The sleeve portion 264 is positioned longitudinally relative to the piston's disc portion 252 such that the piston's disc portion 252 is nearer the sleeve portion's first end 266 than the sleeve portion's second end 268, and such that the sleeve portion's second end 268 is nearer the brake housing's second end 126 than the plate's second side 240. So configured, a first part 270 of the sleeve portion 264 extends within the first portion 222 of internal chamber 134 and toward the brake housing's first end 124. A second part 272 of the sleeve portion 264 extends around the piston's disc portion 252 and within the second portion 230 of internal chamber 134. A third part 274 of the sleeve portion 264 extends primarily within the third portion 234 of internal chamber 134 and toward the brake housing's second end 126. An o-ring 276, present in a seat of the first part 270 of the piston's sleeve portion 264, provides a seal between the sleeve portion 264 and portion 220 of the brake housing's wall 128 to limit and, preferably, prevent the flow of hydraulic fluid between the sleeve portion 264 and portion 220 of the brake housing's wall 128 and into the portion of internal chamber 134 between the disc portion's first side 254 and portion 220 of the brake housing's wall 128 and into bores 224.

Together, the plate 236, piston 250, and protruding portion 228 of the brake housing's wall 128 define a variable volume, brake release chamber 280 within internal chamber 134 that changes in volume in response to movement of the piston 250. More particularly, the first side 238 of the plate 236, the second side 256 of the piston's disc portion 252, and protruding portion 228 of the brake housing's wall 128 define the variable volume, brake release chamber 280. The brake release chamber 280 is in fluid communication with release port 154 via channel 156, which extends within the protruding portion 228 of the brake housing's wall 128 and through the central bore 258 of the piston's disc portion 252, such that hydraulic fluid may flow bi-directionally between the brake release chamber 280 and release port 154. An o-ring 282 or similar seal present in a seat extending around the periphery of the plate 236 limits the passage of hydraulic fluid between the plate 236 and the piston's sleeve portion 264, while an o-ring 284 or similar seal present in a seat in the protruding portion 228 of the brake housing's wall 128 limits the passage of hydraulic fluid between the plate 236 and protruding portion 228.

By virtue of the configuration of the plate 236, piston 250, protruding portion 228 of the brake housing's wall 128, and o-rings 260, 282, 284, the brake release chamber 280 is not in fluid communication with the hydraulic motor's case and is, essentially, isolated from the remainder of the brake housing's internal chamber 134. Such configuration virtually eliminates variations and fluctuations in motor case oil pressure from causing fluctuation or oscillation of the piston's position and unnecessary cycling of the biasing members 226 that may contribute to premature o-ring 260, 276, 282 and biasing member 226 failure. By eliminating or reducing the instance of such premature failure of the biasing members 226, the need to use special, high performance, biasing members 226 is also eliminated, thereby allowing the use of less expensive, conventional biasing members 226.

Also, as a result of the configuration of the piston's sleeve portion 264 relative to the inner surface 130 of the brake housing's wall 128 and the position of o-ring 276, hydraulic fluid from the hydraulic motor's case may leak or pass between the sleeve portion 264 and the inner surface 130 of the brake housing's wall 128 and into the first portion 222 of internal chamber 134 such that the forces exerted on the sleeve portion's first and second ends 266, 268 by the hydraulic fluid from the hydraulic motor's case are substantially equal in magnitude and opposite in longitudinal direction. By essentially eliminating any force differential acting on the piston's sleeve portion 264 in the longitudinal direction that might cause or contribute to translation of the piston 250, the piston 250 is maintained in position by biasing members 226 unless the brake 100 is intentionally released by the delivery of hydraulic fluid to the brake release chamber 280 or by manual release. Thus, such configuration provides improved control over the release of the brake 100 when compared to other devices in which a force differential may exist and cause or contribute to unintended brake release, prevents unwanted release of the brake 100, and prevents brake dragging caused by partial release of the brake 100. Further, such configuration allows the brake 100 to be used with a two zone hydraulic motor.

The brake 100 additionally comprises a brake shaft 290 and a plurality of brake pads 292. The brake shaft 290 is operable, in conjunction with the hydraulic motor's drive shaft 192 and collar 194, to convert orbital motion of the drive shaft 192 into rotary motion of the brake shaft 290 about longitudinal axis 108, and to cause load holding torque to be transferred and applied by the brake 100 to the hydraulic motor's drive shaft 192. The brake shaft 290 has a first end 294 near plate 236 and a second end 296 nearest the wear plate's second end 172, and extends about and along longitudinal axis 108 through the brake housing's second opening 142 at the brake housing's second end 126 and through the wear plate's first opening 188 at the wear plate's first end 170. The brake shaft 290 includes a first portion 298 disposed within the third portion 234 of the brake housing's internal chamber 134 and a second portion 300 disposed within the wear plate's internal chamber 180.

A bushing 302 is present between the inner surface 176 of the wear plate's wall 174 and the brake shaft's second portion 300.

Figure 9:
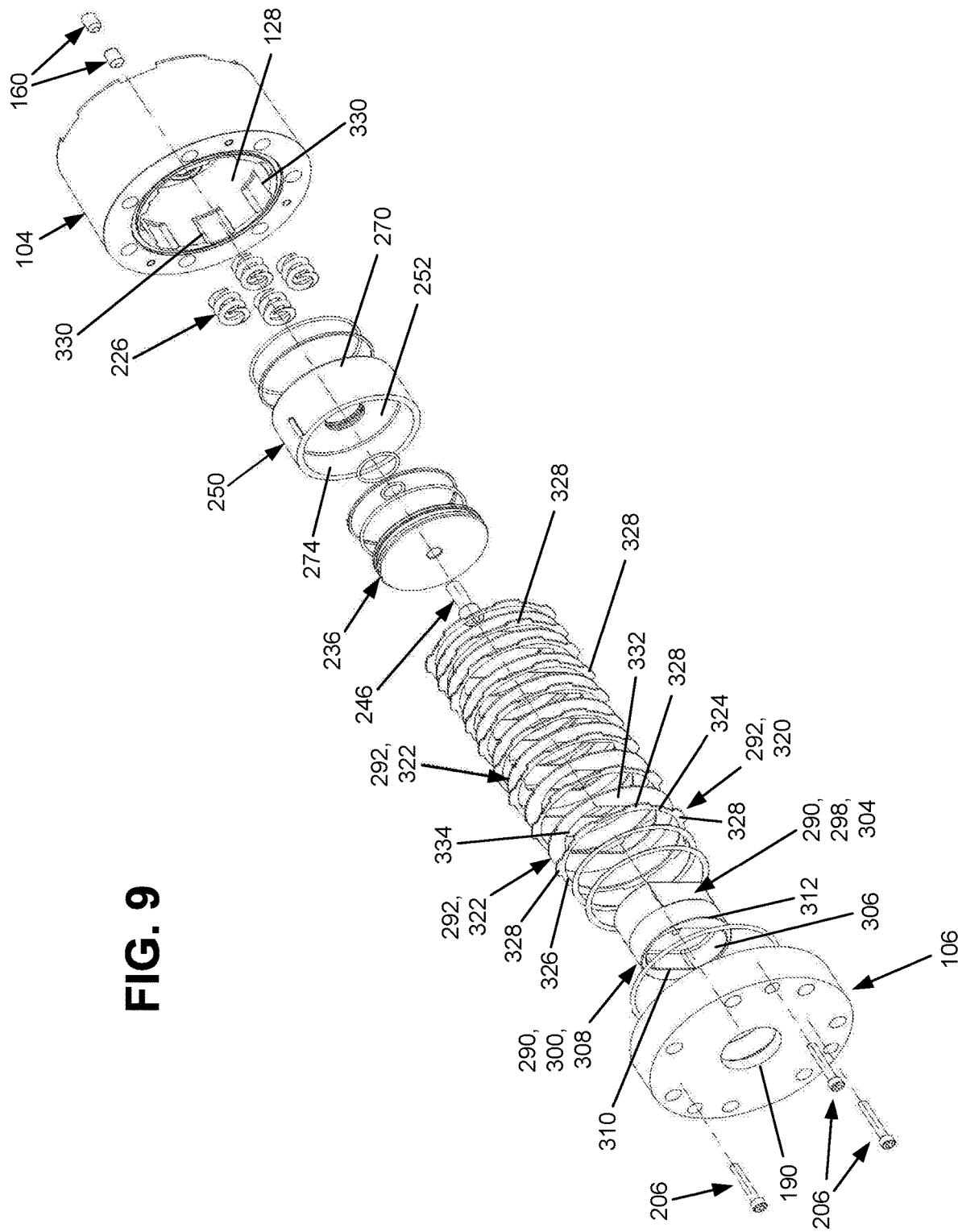
FIG. 9 displays an exploded view of the hydraulic motor brake of FIG. 1.

The brake shaft's first portion 298 has an outer surface 304 with a stadium-shaped cross-section (also sometimes referred to as an "obround-shaped cross-section" or a "discorectangle-shaped cross-section") perpendicular to longitudinal axis 108 (see FIG. 9). The outer surface 304 is shaped to be cooperative with and received by the central bores 326 of rotating brake pads 322 (described in more detail below), with the brake shaft's first portion 298 fitting snugly within the central bores 326 and with little to no relative motion between the brake shaft 290 and the rotating brake pads 322. By virtue of the snug fit, the brake shaft 290 and rotating brake pads 322 move only in unison such that rotation of the brake shaft 290 is imparted to the rotating brake pads 322 and loading holding torque produced by the brake 100 is transmitted and applied to the hydraulic motor's drive shaft 192.

The brake shaft's second portion 300 has an inner surface 306 and an outer surface 308. The inner surface 306 defines a chamber 310 within the brake shaft's second portion 300 extending longitudinally in the direction of longitudinal axis 108. The chamber 310 has a stadium-shaped cross-section perpendicular to longitudinal axis 108 and sized and otherwise configured to receive a collar 194 attached to the drive shaft 192 of a hydraulic motor 102. The outer surface 308 of the brake shaft's second portion 300 has a generally circular cross-sectional shape perpendicular to longitudinal axis 108. The brake shaft's second portion 300 defines an opening 312 at the brake shaft's second end 296 that is in fluid communication with chamber 310 and configured to allow a hydraulic motor's drive shaft 192 and collar 194 to pass therethrough for subsequent positioning of the collar 194 within chamber 310 during attachment of the brake 100 to a hydraulic motor 102.

As described briefly above, the brake 100 comprises a plurality of brake pads 292, including a plurality of stationary brake pads 320 and a plurality of rotating brake pads 322. The brake pads 292 are formed from or include friction-producing material such that when the brake pads 292 are pressed together by a force exerted on the brake pads 292 by piston 250, frictional forces are produced. The friction forces produce load holding torque that the brake pads 292 impart to brake shaft 290 and, hence, to a collar 194 and drive shaft 192 of a hydraulic motor 102 to which the brake 100 is attached, thereby substantially preventing rotation of the drive shaft 192.

The stationary brake pads 320, as seen in FIG. 9, each comprise a ring-like member 324 having a circular-shaped, central bore 326 extending therethrough in the direction of longitudinal axis 108. The circular-shaped, central bore 326 is sized and otherwise configured so that the circular-shaped, central bore 326 receives the brake shaft's first portion 298 therein. Each stationary brake pad 320 also comprises a plurality of tabs 328 extending radially from the outer periphery of the pad's ring-like member 324. The tabs 328 are located at respective angular locations around the ring-like member 324 and are sized and shaped to be received by cooperatively located, sized and shaped recesses 330 formed in the brake housing's wall 128 near the brake housing's second end 126. Contact and interaction between the tabs 328 and brake housing's wall 128 generally prevents rotation of the stationary brake pads 320 about the brake shaft's first portion 298 or relative to the brake housing 104.

The rotating brake pads 322, as seen in FIG. 9, each comprise a ring-like member 332 having a central bore 334 extending therethrough in the direction of longitudinal axis 108. The central bore 334 has a stadium-shaped cross-section perpendicular to longitudinal axis 108 that is sized, shaped and otherwise configured to cooperatively and snugly receive the brake shaft's first portion 298 therein. Because the central bore 334 of ring-like member 332 is sized and configured to snugly receive the stadium-shaped cross-section of the outer surface 304 of the brake shaft's first portion 298 with ring-like member 332 in contact with the outer surface 304 of the brake shaft's first portion 298, the rotating brake pads 322 rotate in unison with brake shaft 290.

Referring back to FIGS. 2, 3, 5 and 9, the brake 100 is assembled by inserting and configuring the various components of the brake 100 described above within the brake housing 104 and wear plate 106. Once the components have been inserted and configured, the brake housing 104 and wear plate 106 are pressed together and oriented with brake housing bores 162 aligned coaxially with wear plate bores 208. Fasteners 206 are inserted through the wear plate's bores 208 and into the brake housing's bores 162. After operation of the fasteners 206 to attach the wear plate 106 and brake housing 104 together, the brake 100 is ready for attachment to a hydraulic motor 102 and use to provide load holding torque, or parking torque, to the hydraulic motor 102. If required, the brake housing 104 and wear plate 106 may be detached from one another by removal of the fasteners 206 and by applying a force sufficient to separate the brake housing 104 and wear plate 106.

The brake 100 is secured to a hydraulic motor 102 for use by first orienting the brake 100 relative to the hydraulic motor 102 with the brake's wear plate 106 nearest the hydraulic motor 102. Then, the brake 100 is oriented relative to the hydraulic motor 102 with bores 152 of the brake housing 104 and bores 200 of the wear plate 106 coaxially aligned with threaded bores 112 of the hydraulic motor 102. Next, the drive shaft 192 and collar 194 of the hydraulic motor 102 are inserted through the wear plate's second opening 190 and the brake shaft's opening 312 so that the collar 194 resides within chamber 310 of the brake shaft's second portion 300. After moving the wear plate 106 and hydraulic motor 102 nearer with the wear plate's second end 172 abutting and in contact with the hydraulic motor 102, fasteners 110 are inserted from the brake housing's first end 124 into and through the brake housing and wear plate's bores 152, 200 and into the hydraulic motor's threaded bores 112. Subsequently, the fasteners 110 are operated to threadedly engage the fasteners 110 with the hydraulic motor 102 and attach the brake 100 and hydraulic motor 102 tightly together. Finally, a hose conveying hydraulic fluid is attached to the brake's release port 154 to supply the brake 100, when release of the brake 100 is desired, with hydraulic fluid at a pressure and flow rate appropriate to release the brake 100. Thereafter, if the brake 100 is to be detached from the hydraulic motor 100, the above-described steps are executed in a reversed order until the brake 100 and hydraulic motor 102 are detached from one another.

Once assembled and attached to a hydraulic motor 102, the brake 100 applies load holding torque to the motor's drive shaft 192. The load holding torque is produced as a result of biasing members 226 being in contact with and exerting respective forces on the first side 254 of the piston's disc portion 252 (see FIG. 8). The forces bias the piston 250 in a position longitudinally nearest the plate 236 and bias the second end 268 of the piston's sleeve portion 264 in engagement with the brake pads 292, thereby pushing the stationary and rotating brake pads 320, 322 together. The engagement of the brake pads 292 produces frictional forces and load holding torque that are transmitted to the brake shaft 290 and that resist rotation of brake shaft 290 and, hence, rotation of the hydraulic motor's collar 194 and drive shaft 192.

When release of the load holding torque from the hydraulic motor's drive shaft 192 (and, therefore, release of the drive shaft 192 for free rotation of the hydraulic motor 102) is desired, pressurized hydraulic fluid is supplied to the brake release chamber 280 via release port 154 and channel 156. Inside the brake release chamber 280, the hydraulic fluid exerts a force on the second side 256 of the piston's disc portion 252 sufficient to overcome the force exerted on the first side 254 of the piston's disc portion 252 by the biasing members 226. Because the plate 236 is fixed in position, the force exerted by the hydraulic fluid causes the piston 250 to begin translating toward the brake housing's first end 124. As more pressurized hydraulic fluid is supplied to the brake release chamber 280, the piston 250 continues to move toward the brake housing's first end 124. With the second end 268 of the piston's sleeve portion 264 also moving toward the brake housing's first end 124, the brake pads 292 are increasingly disengaged and the friction forces and corresponding load holding torque acting on the brake shaft 290 (and, hence, on the motor's drive shaft 192) are increasingly lessened until no load holding torque is present.

If reapplication of the brake's load holding torque is desired, the pressurized hydraulic fluid is allowed to escape from the brake release chamber 280 via channel 156 and release port 154 by, for example, disconnecting the hose supplying such pressurized hydraulic fluid to the brake 100. As the hydraulic fluid escapes the brake release chamber 280, the forces exerted on the first side 254 of the piston's disc portion 252 will gradually overcome the force exerted on the second side 256 of the piston's disc portion 252 by the pressurized hydraulic fluid and the piston 250 will gradually translate toward the plate 236. As the piston 250 translates toward the plate 236, the second end 268 of the piston's sleeve portion 264 increasingly engages the brake pads 292 and produces increasing load holding torque that is transmitted to brake shaft 290 and, therefore, to the hydraulic motor's drive shaft 192.

In the event release of the load holding torque from the hydraulic motor's drive shaft 192 is desired and an appropriate supply of pressurized hydraulic fluid is not available, the brake 100 may be manually operated to release the load holding torque. To do so, plugs 160 are removed from threaded holes 158 located at the brake housing's first end 124 and fasteners 168 are threaded into and through respective nuts 198 positioned adjacent to the brake housing's first end 124 (see FIG. 10). After extending through nuts 198 and upon continued operation of fasteners 168, the fasteners 168 pass through threaded holes 158 without engagement of the fasteners' threads with the threads of the threaded holes 158. The fasteners 168 also extend through bores 224 in portion 220 of the brake housing's wall 128 and into threaded bores 262 in the first side 254 of the piston's disc portion 252. Once the fasteners 168 are securely threadedly-engaged in threaded bores 262, the respective nuts 198 are simultaneously rotated absent rotation of the fasteners 168, thereby causing translation of the piston's disc portion 252 away from plate 236 and toward the brake housing's first end 124. Such movement of the piston's disc portion 252 causes the second end 268 of the piston's sleeve portion 264 to also move toward the brake housing's first end 124. As the piston's sleeve portion 264 moves, the brake pads 292 become increasingly disengaged by the piston's sleeve portion 264 and the friction forces and corresponding load holding torque acting on the brake shaft 290 (and, hence, on the motor's drive shaft 192) are increasingly lessened until no load holding torque is present.

Figure 11:
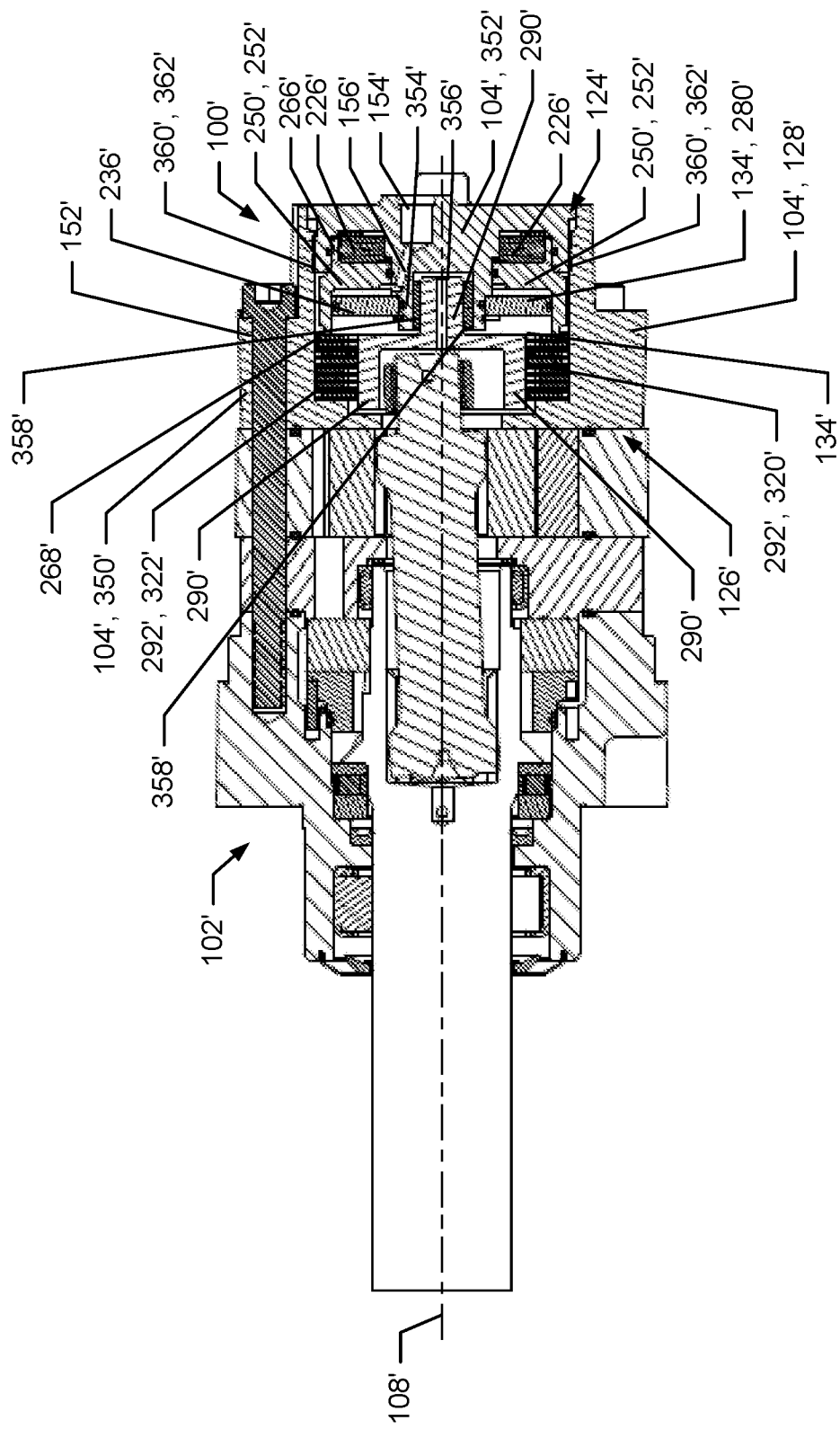
FIG. 11 displays a sectional view of a hydraulic motor brake, in accordance with an alternate example embodiment of the present invention, coupled to a hydraulic motor.

Referring now to FIG. 11, a sectional view of a hydraulic motor brake 100' is displayed in accordance with an alternate example embodiment, coupled to a hydraulic motor 102'. The hydraulic motor brake 100' of the alternate example embodiment is substantially similar to hydraulic motor brake 100 of the example embodiment described above and operates in substantially the same manner. However, in the alternate example embodiment, the brake 100' comprises a housing 104' having a first housing portion 350' and a second housing portion 352'. The first housing portion 350' comprises an elongate, sleeve-like member extending generally circumferentially about longitudinal axis 108' between the brake's first and second ends 124', 126'. The second housing portion 352' comprises an end cap member that extends generally radially from longitudinal axis 108' such that the second housing portion 352' fits within the first housing portion 350' at the brake housing's first end 124'. The first housing portion 350' has internal threads 360' and the second housing portion 352' has external threads 362' that are cooperatively engaged with one another such that tightening or loosening of the second housing portion 352' relative to the first housing portion 350' respectively increases or decreases the force applied to piston 250' by biasing members 226', thereby permitting adjustment and accurate setting of the load holding torque of the brake 100'.

As seen in FIG. 11, the second housing portion 352' has a part 354' that protrudes about longitudinal axis 108' in a direction toward the brake housing's second end 126' similar to portion 228 of the brake housing wall 128 of the example embodiment. Part 354' has a generally circular cross-sectional shape perpendicular to longitudinal axis 108' and defines a bore 356' extending therein. Together, the first and second housing portions 350', 352' define internal chamber 134' within the brake housing 104'.

The brake 100', similar to the brake 100 of the example embodiment, comprises a plate 236' fixedly mounted within the brake housing 104' and a piston 250' that translates bi-directionally along the longitudinal axis 108' and about part 354'. Plate 236' and piston 250' define a variable volume, brake release chamber 280' therebetween that is configured to receive hydraulic fluid via port 154' and passageway 156' formed within second housing portion 352'. Piston 250' has a disc portion 252' and a sleeve portion 264' that extends about the periphery of disc portion 252'. The sleeve portion 264' extends longitudinally between first and second ends 266', 268'. During operation, the second end 268' of the sleeve portion 264' engages and disengages from the brake pads 292' in a manner substantially similar to that described above in connection with the example embodiment.

Unlike the brake 100 of the example embodiment, the brake 100' of the alternate example embodiment further comprises a brake shaft 290' that extends into bore 356'. Bushings 358' mounted within the bore 356' permit rotation of the brake shaft 290' relative to part 354' of the brake housing's second portion 352'.

Example Embodiments

According to a first embodiment is provided a hydraulic motor brake for selectively providing load holding torque to a hydraulic motor having a drive shaft extending therefrom, the hydraulic motor brake comprising: a brake housing mountable to a hydraulic motor, said brake housing defining an internal chamber and a port for receiving pressurized hydraulic fluid from a source fluidly connected to said port; a plurality of friction-producing members located within said internal chamber and operable to apply load holding torque to the drive shaft of the hydraulic motor; a plate fixedly mounted to said brake housing within said internal chamber; a piston mounted within said internal chamber for bi-directional translation relative to said brake housing and said plate along a longitudinal axis, said piston extending about said plate and defining a brake release chamber with said brake housing and said plate, said brake release chamber being in fluid communication with said port for receiving pressurized hydraulic fluid from said port; and a biasing member located between said brake housing and said piston, said biasing member being operable to exert a biasing force on said piston biasing said piston along said longitudinal axis in a position nearest said plate and in engagement with said friction-producing members; wherein said piston is operable to translate along said longitudinal axis away from said plate and disengage from said friction-producing members in response to pressurized hydraulic fluid being received by said brake release chamber from said port and exerting a force on said piston sufficient to overcome the biasing force exerted on said piston by said biasing member.

According to a second embodiment is provided the first embodiment, wherein said brake release chamber comprises a chamber having a variable volume.

According to a third embodiment is provided the second embodiment, wherein movement of said piston causes variation in the volume of said brake release chamber.

According to a fourth embodiment is provided the first embodiment, wherein said piston comprises a sleeve portion extending about said longitudinal axis, and wherein said plate comprises a disc-like member extending about said longitudinal axis and being received within said sleeve portion of said piston.

According to a fifth embodiment is provided the first embodiment, wherein said piston comprises a disc portion extending about said longitudinal axis and parallel to said plate.

According to a sixth embodiment is provided the first embodiment, wherein said piston defines a bore extending therethrough, and wherein said brake housing has a portion protruding into said internal chamber and received at least partially within said bore of said piston.

According to a seventh embodiment is provided the sixth embodiment, wherein said plate is fixedly mounted to said portion of said brake housing.

According to an eighth embodiment is provided the first embodiment, wherein said brake housing defines a bore extending therethrough and said piston defines a threaded bore coaxially aligned with said bore of said brake housing, wherein said bore of said brake housing and said threaded bore of said piston are configured to receive a fastener, and wherein said piston is further operable to translate along said longitudinal axis away from said plate and disengagement from said friction-producing members in response to tightening of said fastener into said threaded bore of said piston.

According to a ninth embodiment is provided the first embodiment, wherein said brake housing is detachably attachable to the hydraulic motor.

According to a tenth embodiment is provided the first embodiment, wherein said hydraulic motor brake further comprises a wear plate detachably secured to said brake housing.

According to an eleventh embodiment is provided the tenth embodiment, wherein said wear plate is interposed between said brake housing and the hydraulic motor when said brake housing is attached to the hydraulic motor.

According to a twelfth embodiment is provided a hydraulic motor brake for selectively providing load holding torque to a hydraulic motor having a plurality of threaded bores for receiving a corresponding plurality of fasteners and having a protruding drive shaft, said hydraulic motor brake comprising: a brake housing having a first end and a longitudinally-disposed second end, said brake housing defining a plurality of bores extending between said first end and said second end and arranged for coaxial alignment with the threaded bores of the hydraulic motor, said brake housing further defining an internal chamber and comprising a plurality of friction-producing members operable to selectively exert load holding torque to the drive shaft of the hydraulic motor or not exert load holding torque to the drive shaft of the hydraulic motor; and a wear plate having a first end and a longitudinally-disposed second end, said wear plate being detachably attachable to said brake housing with said first end of said wear plate abutting said second end of said brake housing, said wear plate defining a plurality of bores extending between said first end and said second end, said bores of said wear plate being arranged for coaxial alignment with said bores of said brake housing; wherein said brake housing and said wear plate are detachably attachable to the hydraulic motor as a single unitary component by insertion of the fasteners through said bores of said brake housing and said bores of said wear plate, and into the threaded bores of the hydraulic motor, and by subsequent tightening of the fasteners.

According to a thirteenth embodiment is provided the twelfth embodiment, wherein said plurality of bores of said brake housing comprise a first plurality of bores and said brake housing further defines a second plurality of bores for attachment of said wear plate, wherein said plurality of bores of said wear plate comprises a first plurality of bores and said wear plate further defines a second plurality of bores arranged for coaxial alignment with said second plurality of bores of said brake housing, and wherein said second plurality of bores of said brake housing comprise threaded bores and said wear plate is detachably securable to said brake housing by insertion of fasteners through said second plurality of bores of said wear plate and into said threaded bores of said second plurality of bores of said brake housing and by tightening of the fasteners in said threaded bores of said second plurality of bores of said brake housing.

According to a fourteenth embodiment is provided the twelfth embodiment, wherein said wear plate is interposed between said brake housing and the hydraulic motor when said hydraulic brake is attached to the hydraulic motor.

According to a fifteenth embodiment is provided the twelfth embodiment, wherein said second end of said wear plate abuts the hydraulic motor when said hydraulic brake is attached to the hydraulic motor.

According to a sixteenth embodiment is provided the twelfth embodiment, wherein said hydraulic brake further comprises a plate secured to and within said brake housing, and wherein said hydraulic brake further comprises a piston mounted within said brake housing for bi-directional movement along a longitudinal axis.

According to a seventeenth embodiment is provided the sixteenth embodiment, wherein said plate and said piston at least partially define a brake release chamber therebetween having a variable volume.

According to an eighteenth embodiment is provided the sixteenth embodiment, wherein said hydraulic brake further comprises a biasing member operable to exert a biasing force on said piston tending to engage said piston with said friction-producing members, wherein said wear plate defines an internal chamber for receiving the drive shaft of the hydraulic motor, and wherein said plate is located longitudinally between said internal chamber of said wear plate and said piston so as to at least partially minimize cycling of said biasing member.

Whereas the present invention has been described in detail above with respect to an example embodiment and alternate example embodiment thereof, it should be appreciated that variations and modifications might be effected within the spirit and scope of the present invention.

What is claimed is:

1. A hydraulic motor brake for selectively providing load holding torque to a hydraulic motor having a drive shaft extending therefrom, said hydraulic motor brake comprising:
   a brake housing mountable to a hydraulic motor, said brake housing defining an internal chamber and a port for receiving pressurized hydraulic fluid from a source fluidly connected to said port, a biasing member portion of said brake housing including a radially outward facing surface facing radially away from a longitudinal axis of the hydraulic motor brake;
   a plurality of friction-producing members located within said internal chamber and operable to apply load holding torque to the drive shaft of the hydraulic motor;
   a plate fixedly mounted to said brake housing within said internal chamber;
   a piston mounted within said internal chamber for bi-directional translation relative to said brake housing and said plate along the longitudinal axis, said piston extending about said plate and defining a brake release chamber with said brake housing and said plate, said brake release chamber being in fluid communication with said port for receiving pressurized hydraulic fluid from said port;
   a biasing member positioned within the biasing member portion of the brake housing, said biasing member being operable to exert a biasing force on said piston biasing said piston along said longitudinal axis for engagement with said friction-producing members, a first portion of the piston extending longitudinally away from said plate and longitudinally overlapping the biasing member; and
   a seal element positioned on the radially outward facing surface of the biasing member portion of the brake housing and radially between the radially outward facing surface and the first portion of the piston,
   wherein said piston is operable to translate along said longitudinal axis away from said plate and disengage from said friction-producing members in response to pressurized hydraulic fluid being received by said brake release chamber from said port and exerting a force on said piston sufficient to overcome the biasing force exerted on said piston by said biasing member.

2. The hydraulic motor brake of claim 1, wherein said brake release chamber comprises a chamber having a variable volume.

3. The hydraulic motor brake of claim 2, wherein movement of said piston causes variation in the volume of said brake release chamber.

4. The hydraulic motor brake of claim 1, wherein said piston comprises a sleeve portion extending about said longitudinal axis, and wherein said plate comprises a disc-like member extending about said longitudinal axis and being received within said sleeve portion of said piston.

5. The hydraulic motor brake of claim 1, wherein said piston comprises a disc portion extending about said longitudinal axis and parallel to said plate.

6. The hydraulic motor brake of claim 1, wherein said piston defines a bore extending therethrough, and wherein said brake housing has a portion protruding into said internal chamber and received at least partially within said bore of said piston.

7. The hydraulic motor brake of claim 6, wherein said plate is fixedly mounted to said portion of said brake housing.

8. The hydraulic motor brake of claim 1, wherein said brake housing defines a bore extending therethrough and said piston defines a threaded bore coaxially aligned with said bore of said brake housing, wherein said bore of said brake housing and said threaded bore of said piston are configured to receive a fastener, and wherein said piston is further operable to translate along said longitudinal axis away from said plate and disengage from said friction-producing members in response to tightening of said fastener into said threaded bore of said piston.

9. The hydraulic motor brake of claim 1, wherein said brake housing is detachably attachable to the hydraulic motor.

10. The hydraulic motor brake of claim 1, wherein said hydraulic motor brake further comprises a wear plate detachably secured to said brake housing.

11. The hydraulic motor brake of claim 10, wherein said wear plate is interposed between said brake housing and the hydraulic motor when said brake housing is attached to the hydraulic motor.

12. A hydraulic motor brake for selectively providing load holding torque to a hydraulic motor having a plurality of threaded bores for receiving a corresponding first plurality of fasteners and having a protruding drive shaft, said hydraulic motor brake comprising:
   a brake housing defining a longitudinal axis and having a first end and a longitudinally-disposed second end, said brake housing defining a first plurality of brake housing bores extending between said first end and said second end and arranged for coaxial alignment with the threaded bores of the hydraulic motor, and a second plurality of brake housing bores, said brake housing further defining an internal chamber and comprising a plurality of friction-producing members operable to selectively exert load holding torque to the drive shaft of the hydraulic motor or not exert load holding torque to the drive shaft of the hydraulic motor; and
   a wear plate having a first end and a longitudinally-disposed second end, said wear plate being detachably attachable to said brake housing with said first end of said wear plate abutting said second end of said brake housing, said wear plate defining a first plurality of wear plate bores extending between said first end and said second end, said first plurality of wear plate bores of said wear plate being arranged for coaxial alignment with said first brake housing bores, said wear plate defining a second plurality of wear plate bores arranged for coaxial alignment with said second plurality of brake housing bores;
   wherein said brake housing and said wear plate are detachably attachable to the hydraulic motor as a single unitary component by insertion of the first plurality of fasteners through said first plurality brake housing bores and said first plurality of wear plate bores, and into the threaded bores of the hydraulic motor, and by subsequent tightening of the first plurality of fasteners, wherein said wear plate is further detachably securable to said brake housing by insertion of a second plurality of fasteners through said second plurality of wear plate bores and into said second plurality of brake housing bores of said brake housing; and wherein the second plurality of brake housing bores and the second plurality of wear plate bores are arranged circumferentially around the longitudinal axis such that first and second circumferentially adjacent ones of the second plurality of brake housing bores and corresponding first and second ones of the second plurality of wear plate bores are separated by a first angle about the longitudinal axis, and the first and a third circumferentially adjacent ones of the second plurality of brake housing bores and the corresponding first and a third ones of the second plurality of wear plate bores are separated by a second angle about the longitudinal axis, the first and second angles being unequal.

13. The hydraulic brake of claim 12, wherein said wear plate is interposed between said brake housing and the hydraulic motor when said hydraulic brake is attached to the hydraulic motor.

14. The hydraulic brake of claim 12, wherein said second end of said wear plate abuts the hydraulic motor when said hydraulic brake is attached to the hydraulic motor.

15. The hydraulic brake of claim 12, wherein said hydraulic brake further comprises a plate secured to and within said brake housing, and wherein said hydraulic brake further comprises a piston mounted within said brake housing for bi-directional movement along the longitudinal axis.

16. The hydraulic brake of claim 15, wherein said plate and said piston at least partially define a brake release chamber therebetween having a variable volume.

17. The hydraulic brake of claim 15, wherein said hydraulic brake further comprises a biasing member operable to exert a biasing force on said piston tending to engage said piston with said friction-producing members, wherein said wear plate defines an internal chamber for receiving the drive shaft of the hydraulic motor, and wherein said plate is located longitudinally between said internal chamber of said wear plate and said piston so as to at least partially minimize cycling of said biasing member.

18. A hydraulic motor brake for selectively providing load holding torque to a hydraulic motor having a drive shaft extending therefrom, said hydraulic motor brake comprising:

a brake housing mountable to a hydraulic motor, said brake housing defining an internal chamber and a port for receiving pressurized hydraulic fluid from a source fluidly connected to said port, a biasing member portion of said brake housing including a wall having an inner surface and an outer surface, the inner surface defining a biasing member bore;

a plurality of friction-producing members located within said internal chamber and operable to apply load holding torque to the drive shaft of the hydraulic motor;

a plate fixedly mounted to said brake housing within said internal chamber;

a piston mounted within said internal chamber for bi-directional translation relative to said brake housing and said plate along a longitudinal axis, said piston extending about said plate and defining a brake release chamber with said brake housing and said plate, said brake release chamber being in fluid communication with said port for receiving pressurized hydraulic fluid from said port;

a biasing member positioned within said biasing member bore and located between said brake housing and said piston, said biasing member being operable to exert a biasing force on said piston biasing said piston along said longitudinal axis for engagement with said friction-producing members; and a seal element positioned on the outer surface of the wall of the biasing member portion of the brake housing and between the outer surface and the piston along a reference line perpendicular to the longitudinal axis, wherein said piston is operable to translate along said longitudinal axis away from said plate and disengage from said friction-producing members in response to pressurized hydraulic fluid being received by said brake release chamber from said port and exerting a force on said piston sufficient to overcome the biasing force exerted on said piston by said biasing member; and wherein said brake housing defines a bore extending therethrough and said piston defines a threaded bore coaxially aligned with said bore of said brake housing, wherein said bore of said brake housing and said threaded bore of said piston are configured to receive a fastener, and wherein said piston is further operable to translate along said longitudinal axis away from said plate and disengage from said friction-producing members in response to tightening of said fastener into said threaded bore of said piston.

* * * * *